US008948180B2

(12) United States Patent
Schlansker et al.

(10) Patent No.: US 8,948,180 B2
(45) Date of Patent: Feb. 3, 2015

(54) ROUTING ENCAPSULATED DATA PACKETS ONTO SELECTED VLANS

(71) Applicant: Hewlett-Packard Development Company, L.P., Houston, TX (US)

(72) Inventors: Michael Schlansker, Los Altos, CA (US); Jean Tourrilhes, Mountain View, CA (US); Jose Renato G. Santos, Morgan Hill, CA (US); Stephen G. Low, Austin, TX (US); Paul Allen Bottorff, Portola Valley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 184 days.

(21) Appl. No.: 13/654,670

(22) Filed: Oct. 18, 2012

(65) Prior Publication Data
US 2014/0112137 A1 Apr. 24, 2014

(51) Int. Cl.
*H04L 12/28* (2006.01)
*H04J 1/16* (2006.01)

(52) U.S. Cl.
USPC ...... 370/392; 370/235; 370/255; 370/395.21; 709/238

(58) Field of Classification Search
None
See application file for complete search history.

(56) References Cited

U.S. PATENT DOCUMENTS

2012/0243544 A1* 9/2012 Keesara .................. 370/395.53
2013/0142201 A1* 6/2013 Kim et al. .................. 370/392

OTHER PUBLICATIONS

Schlansker, Mike et al., "Ensemble Routing for Datacenter Networks", Hewlett-Packard Laboratories article, ANCS (2010), 12 pages.

* cited by examiner

*Primary Examiner* — Awet Haile
(74) *Attorney, Agent, or Firm* — Mahamedi Paradice; Drew Herndon

(57) ABSTRACT

A system and method are provided to route packets in a data center network. Individual packets are encapsulated at an edge of the data center network, so that each encapsulated packet includes a set of header fields, such as a tenant identifier. For each encapsulated packet, a hash class is determined from the set of header fields. A routing virtual local area network (VLAN) is selected for the packet based on the tenant identifier and the hash class.

15 Claims, 3 Drawing Sheets

ROUTING ENCAPSULATED DATA PACKETS ONTO SELECTED VLANS

BACKGROUND

Data center networks can scale to accommodate attached hosts and devices. Increasingly, however, data center networks must manage millions of communication flows through a complex fabric topology while maintaining a limited state and the core of the network.

Routing architecture and techniques exist (e.g., Hash-Based Routing) to enable multipath networks and scalable data centers. Such techniques include ensemble routing (or ensemble packet routing). Ensemble routing refers to routing techniques that dynamically manage large ensembles of transient and unpredictable flows between end stations.

DETAILED DESCRIPTION

Figure 1:
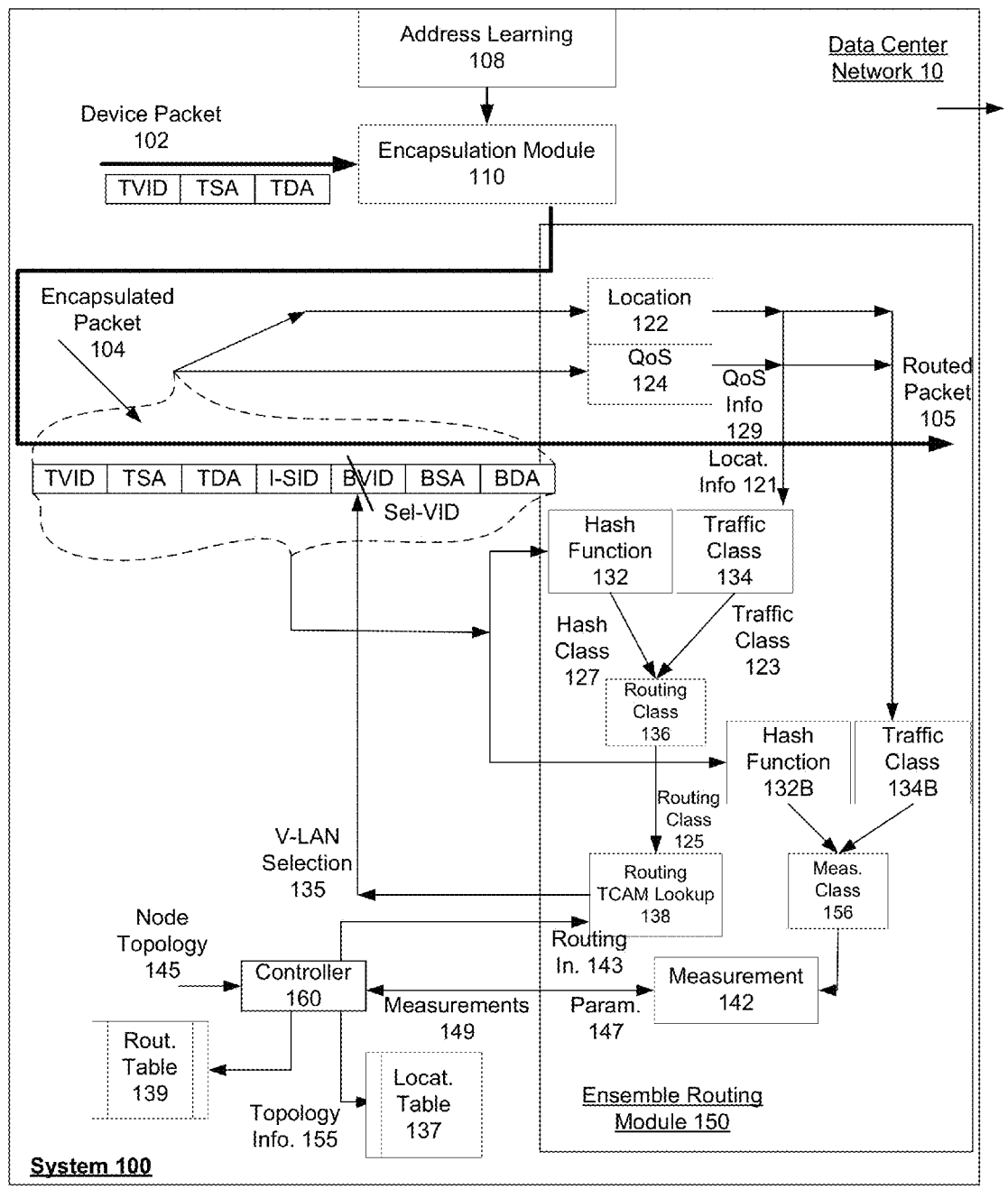
FIG. 1 illustrates an example system for handing incoming packets for a data center network using ensemble routing and packet encapsulation.

Examples described herein provide for ensemble routing encapsulated data packets onto a network, such as a data center network. In examples described herein, packets for a data center network are encapsulated to include data that identifies edge devices of the data center network that are to handle the packets. Ensembles of packets are routed through the data center network using information contained within each packet that indicates the edge devices that are to handle each packet.

Still further, some examples described herein implement packet encapsulation with multipath ensemble routing in order to optimize ensemble packet routing in data networks. In examples described herein, ensemble routing of packets can be optimized based on, for example, traffic measurements and/or load balancing considerations.

Generally, in ensemble routing, each ensemble identifies flows that have diverse sources and destinations, and packets within a flow are mapped to the same ensemble, so that each flow is carried on a single path that preserves packet order. Examples described herein provide for ensembles of flows that include encapsulated data packets. The encapsulated data packets include additional information that identifies, or is indicative of, the edge devices that are to handle the packets. This information can be used to select routing VLANs for ensembles of encapsulated packets.

In the context of large-scale networks of arbitrary topologies, an example recognizes that ensemble routing eliminates measurement and control for individual flows, and instead manage large data centers using summary data. Ensemble routing enables traffic to be controlled through a large data center using only a small amount of routing state information. As a result, ensemble routing enables fast and reactive management of a large number of data flows, using simpler control than would otherwise be possible for per flow management. However, an example also recognizes that ensemble routing also sacrifices fine-grained control for individual flows. As a result, under conventional ensemble routing, some flows may take non-optimal paths.

Examples described herein further recognize that, while technology such as ensemble routing can provide active management of traffic within a large-scale network, networks using such routing technology can end up handling too many device addresses to record. For example, core switches in the data center network may not have Ethernet learning tables of sufficient size to learn detailed end-station address information for the network. Additionally, an example recognizes that packet processing performed through conventional ensemble routing technologies omit extraction of location specific information from individual device addresses that are visible within each packet.

An example recognizes that encapsulation technologies can structure packets to include information that addresses some of the shortfalls in conventional approaches to ensemble routing. In particular, the use of encapsulation with ensemble routing enables improved active management of traffic, to enable, for example, improved routing optimization, load-balancing and traffic de-congestion.

A system and method are provided to route packets in a data center network. Individual packets are encapsulated at an edge of the data center network, so that each encapsulated packet includes a set of header fields such as a tenant identifier. For each encapsulated packet, a hash class is determined from the set of header fields. A routing virtual local area network (VLAN) is selected for the packet based on the tenant identifier and the hash class.

Still further, another example provides for one or more network devices to provide traffic measurement data for the data center network. The accuracy of traffic measurements is improved using encapsulation information that identifies edge device addresses. The one or more network devices encapsulate tenant packets for the data center network. The encapsulated data packets may be routed in ensembles onto routing VLANs that are considered traffic measurements and parameters.

According to another aspect, a system includes a network device and a controller. The network device operates to encapsulate a collection of packets. Each encapsulated packet includes a set of header fields, such as a tenant identifier. A hash class is determined for each of the encapsulated packets in the collection using the respective set of header fields for that encapsulated packet. Traffic information is measured for at least some of the encapsulated packets using at least the hash class and tenant identifier of the individual encapsulated packets that are measured. The controller optimizes the routing information for use by the network device in selecting virtual local area networks (VLANs) to route encapsulated packets as ensembles. The controller also optimizes the routing information based on traffic information.

According to another aspect, a system includes one or more edge devices for the data center network, and one or more controllers. The one or more controllers communicate information to the one or more edge devices, the information including topology information for the data center network. The one or more edge devices encapsulate a collection of packets, and route each encapsulated packet onto a routing virtual local area network (VLAN). The routing VLAN is selected using at least a hash class and a traffic class. The hash class is determined from one or more fields in a set of fields included with each encapsulated packet. The traffic class is determined using location information that is based on one or more fields in the set of fields, and the topology information.

System Overview

FIG. 1 illustrates an example system for handling incoming packets for a data center network using ensemble routing and packet encapsulation. In an example of FIG. 1, system 100 includes an encapsulation module 110 and an ensemble routing module 150. The system 100 encapsulates packets, and then routes the encapsulated packets at the edge of the data center network 10. The packets are routed across the data center network 10 and de-encapsulated before being processed by a receiving device (e.g., tenant device). The system 100 can also include a controller 160 which can perform functions that include providing data for determining location information from packets, and routing designation for routing encapsulated packets based on, for example, network traffic considerations and parameters.

In an example of FIG. 1, the encapsulation module 110 can operate to place (or encapsulate) each incoming packet into a backbone packet having a simplified backbone address that indicates points where the packet enters and exits a backbone of the data center network 10. The ensemble routing module 150 performs ensemble routing on packets that are encapsulated by the encapsulation module 110, using information determined from the individual packets. As described in greater detail, the ensemble routing module 150 further modifies packets that have been encapsulated by the encapsulation module 110, so that the encapsulated modules are routed as part of an ensemble of packets that can include multiple packet flows.

Moreover, with input provided from the controller 160, the ensemble routing module 150 manages or optimizes use of routing VLANs in the core of the data center network 10, including in regard to routing the individual packets as packet ensembles. In particular, the ensemble routing module 150 can route ensembles of packets onto routing VLANs with consideration for network traffic, traffic optimization, congestion and/or load balancing.

In an example of FIG. 1, the encapsulation module 110 receives incoming packets 102 from, for example, tenants of a data center network 10. The encapsulation module 110 can implement any one of a variety of protocols to encapsulate the incoming packet 102. In one implementation, the encapsulation module 110 is implemented by a Provider Backbone Bridging (PBB) component that serves as a point of entry for packets communicated by multiple tenant devices (e.g., devices that use the data center network 10). The data center network 10 can include multiple edge devices that serve as entry and/or exit points for packets that traverse the data center network 10.

While PBB provides one example for encapsulation, in variations, encapsulation module 110 can be implemented by other devices that utilize different forms of encapsulation techniques, including other MAC-in-MAC or MAC-in-IP encapsulation techniques. For example, encapsulation module 110 may utilize Network Virtualization using Generic Routing Encapsulation ("NVGRE") as an alternative to PBB. While examples described herein are in the context of PBB encapsulation, other examples may implement alternative forms of encapsulation using concepts described herein, with variations in implementation that can accommodate differences in the alternative kinds of encapsulation (e.g., NVGRE encapsulation utilizes alternative header fields, etc.).

Among other provisions, encapsulation can decrease the number of device addresses that are processed in the core of the data center network 10. For example, the encapsulation module 110 may include a bridging device that associates each tenant device address with a bridge address corresponding to a physical location at an edge of the data center network 10, where the tenant device is attached. This enables the encapsulation module 110 to identify a smaller number of location tags that are used in the core which represent edge bridge addresses. The encapsulation module 110 can include an address learning component 108 that provides a table or other data structure for associating each device address with a location tag or edge bridge address for that device. The location tag is then embedded in one or more fields of the data packet 102 after the data packet is encapsulated and used to route the packet to through the network core.

As shown by an example of FIG. 1, the encapsulation module 110 receives incoming packets 102. Prior to encapsulation, the incoming packets 102 include a set of header fields that include tenant information, such as tenant destination address (TDA), tenant source address (TSA), and tenant VLAN ID (TVID). The encapsulation module 110 outputs an encapsulated data packet 104 with additional header fields. In examples described herein, the encapsulated data packet 104 include additional information that identifies the source or tenant for the packet transmission, as well as the edge-entry and edge-exit points for the data packet 102 on the data center network 10.

By way of example, the encapsulation module 110 and corresponding address learning component 108 can be implemented by a backbone edge bridge ("BEB") and PBB encapsulation module. PBB encapsulation can also generate an I-SID field in the header of the encapsulated packet 104. The I-SID is an identifier for a service provided at the edge of the data center network 10. Under conventional PBB, the I-SID can be used to determine a broadcast domain for the encapsulated data packet 104. In the example of FIG. 1, the I-SID can be correlated to a tenant identifier. The tenant can correspond to an entity that is allocated (or provided entitlement) to a portion of the resources of the data center network 10.

The header fields for the encapsulated data packet 104 also include the outer or backbone edge bridge destination (BDA), the outer or backbone edge bridge source (BSA), and the outer or backbone bridge VLAN ID (BVID). As described in greater detail below, these additional header fields can also be used to select routes for the encapsulated packets (based on packet ensembles), as well as to route the encapsulated packets.

An example of FIG. 1 performs ensemble routing on the output packets of the encapsulation module 110 (e.g., PBB), resulting in selection of a routing VLAN for the individual packets. In some implementations, the selection of the routing VLAN is optimized, based on considerations that can be determined from traffic measurements. The selected VLAN for the packet can be specified in the BVID field of the packet header for the encapsulated packet 104. Thus, the BVID field is overwritten with an alternative value that takes into account optimization factors for the individual packet and its ensemble. In the example shown by FIG. 1, the resulting modified header for the encapsulated packet 104 accommodates the PBB encapsulation format, while also incorporating information based on an output of the ensemble routing module 150 (for example a BVID that is chosen to improve routing).

The ensemble routing module 150 can include multiple components or processes for routing encapsulated packets based on ensemble determinations, as well as optimization/packet management considerations. In an example of FIG. 1, the ensemble routing module 150 includes location processing component 122, which can extract select header fields of the encapsulated packet 104. The extracted fields can be used to determine location information, including information about the end points of the data packet.

The location information 121 can be derived from the header of encapsulated packet 104 in a location processing component 122. More specifically, in one implementation, the location processing component 122 can determine location information 121 by processing header fields included in the encapsulated packet 104. In one aspect, the location processing component 122 uses a location lookup table 137 to reference information determined from extracted fields (e.g., BSA and BDA) against a physical location (e.g., point of egress and ingress into the network) in the topology of the data center network 10. Additionally, when a service is located at fixed and known locations, the I-SID field provides useful location information.

The location lookup table 137 can be populated by, for example, the controller 160, which can process nodal topology input 145 in order to be provide topology information 155 to populate the location lookup table 137. In one example, the nodal topology input 45 can be determined from a network discovery tool, which can identify the physical locations of the various edge devices, as well as the links that interconnect them, and the addresses associated with the different devices. The location lookup table 137 can be used to determine location information 121, which can be utilized in routing and/or measuring traffic for individual packets. In one aspect, the location lookup table 137 is able to reference addresses and other fields of the edge devices (e.g., BSA or BDA fields) in the network against location information 121 specifying a physical location of an edge device in the network. In particular, fields such as provided by the I-SID, the BSA, BDA, or other fields may be processed using location lookup table 137 to provide determine location information 121 (e.g., physical locations of ingress/egress for packet).

In an example, the location information 121 can be used to affect routing. In an example of FIG. 1, the location information 121 can be used by the traffic class component 134 to determine a traffic class 123 for the encapsulated packet 104. The traffic class 123 can then be used in selecting a routing class.

A quality of service (QoS) module 124 can identify packet header information relating to, for example, the designation of priority or type ("QoS information 129") for the packet. For example, a service may be identified using the I-SID field to implement Quality of Service management where a high priority service is routed through one or more paths that provide more than a fair share of bandwidth or throughput to the high priority service. The QoS module 124 processes the packet header to produce QoS information 129 which is placed by the traffic class 134 and used to select a routing class 125.

As in the case with conventional ensemble routing techniques, the QoS information 129 can also be used by traffic class component 134 to determine the traffic class 123 for the packet. The traffic class 123 can be used as a basis for determining ensembles amongst the encapsulated packets.

The header fields of the encapsulated packet 104 can also be used to determine the hash class 127 for the packet. A hash function 132 can generate, from the fields of the encapsulated packet 104, a hash class tag 127. The hash function 132 may operate to assign hash tag class 127 in a manner that enables the hash tags to form a basis for optimizing path diversity.

A routing class component 136 can use the traffic class 123 and/or hash class 127 to determine the routing class 125 for the encapsulated data packet 104. In this way, the routing class 125 can be determined in part from, for example, location information 121 (used to determine the traffic class 123), as well as the hash class 127. The routing class 125 can correspond or relate to a determined ensemble for the data packet.

In one implementation, the ensemble routing module 150 includes components that perform routing and measurement functions. The ensemble routing module 150 can include a routing component 138 that receives routing input 143. The controller 160 can maintain a routing lookup table 139 (e.g., stored in a Ternary Content Addressable Memory or "TCAM") that maintains routing information. The routing lookup table 139 can be optimized to reflect routing determinations based on traffic measurements 149, received from the measurement component 142. The routing input 143 can be provided from the controller 160 to the routing component 138, which operates on a packet-by-packet basis to select routing designations (e.g., VLAN selection 135) for encapsulated packets. As such, the routing component 138 can use the routing input 143 to make routing designations that optimize packet routing based on considerations such as traffic management or balancing.

The measurement component 142 can perform measurement action on some or all of the encapsulated packets. A measurement class 156 can be determined for some or all of the packets. The measurement class 156 can be determined from a hash function 132B that utilizes the fields of the packet. The hash function 132B can be the same or different from that used to route the packets. Additionally, the measurement class 156 can also be determined from the traffic class 134B. The traffic class 134B can also be determined from the location information 121 and the QoS information 129. The measurement class 156 can be used by the measurement component 142 to perform a measurement action, such as counting. The measurement information 149 can be communicated to the controller 160.

According to one aspect, the controller 160 can communicate parameters 147 to the measurement component 142 that identify what ensembles/packets should be measured by the measurement component 142. The measurement component 142 communicates traffic measurements 149, which can be based in part on the routing class 125 iterations, including the location information 121 determined from individual packets.

In one aspect, controller 160 can perform calculations that determine the routing information 143 based on the measurement information 149 provided form the ensemble module 150. The routing information 143 can be used to optimize routing designations that are maintained in the routing lookup table 138 (e.g., TCAM table). The routing information 143 can identify VLAN selections 135 with reference to parameters that include the routing class 125 (or traffic class 123 or hash class 127). Thus, in an example of FIG. 1, the routing component 138 uses the routing class 125 to determine the VLAN selection 135 for each individual packet.

In one implementation, the routing class 125 is also recorded by the measurement component 142, and information that is based on the routing class 125 is communicated to the controller 160. In one implementation, the controller 160 can record traffic patterns, including identifying overloaded routing VLANs, under-used routing VLANs, and other considerations that can optimize the selection of the routing VLANs based on both traffic considerations and ensemble routing provisions. The controller 160 can implement optimization considerations based on the recorded traffic considerations, and the routing information that populates the lookup table 139 can account for the optimization determinations of the controller 160. In this way, the routing component 138 can select VLANs for packets based on, for example, optimization considerations.

Methodology

Figure 2:
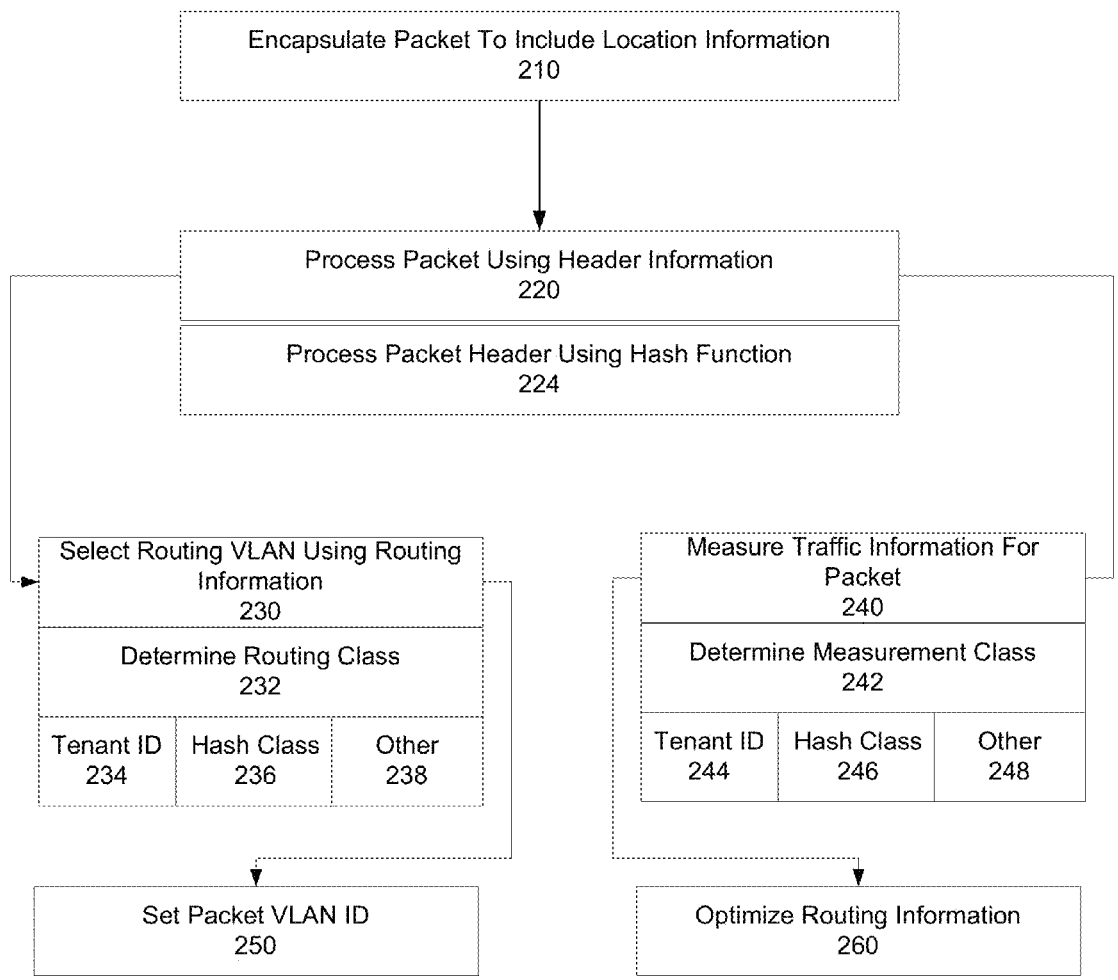
FIG. 2 illustrates an example method for handling incoming packets using ensemble routing and packet encapsulation.

FIG. 2 illustrates an example method for handling incoming packets using ensemble routing and packet encapsulation. A method such as described with FIG. 2 can be implemented using a system that includes a controller and one or more network devices. The network devices can route incoming packets using routing information that is provided by a controller.

According to some aspects, incoming packets are encapsulated at an edge of a data center network to include additional header fields (210). The additional header fields include header fields that specify additional location information for the packet. For example, under PBB, the additional header fields include I-SID, B-VID, BSA and BDA. The incoming packets are processed using the header information for the packet (220). In one implementation, the processing of the packet includes using a hash function (224).

The incoming packets can be routed by selecting a routing VLAN (230). The routing VLAN can be selected using routing information that can be provided by a controller. As described with steps 240, the routing information can be optimized by the controller measuring the traffic information. In one implementation, a routing class is determined for the packets (232), and the routing class is referenced against routing information in order to determine the routing VLAN for the incoming packet. The determination of the routing class can be based on, for example, (i) a tenant identifier or other location information provided in the header field of the incoming packet (234), (ii) a hash class for the incoming packet, determined from the header fields of the incoming packet (236), and/or other information included with the header fields of the incoming packets (238). The incoming packets can be routed by, for example, the network device setting the selected VLAN identifier in one of the fields of the incoming packet (250). For example, with reference to FIG. 1 the BVID field of the packet can be replaced with the selected routing VLAN for the packet.

For at least some incoming packets, traffic information is measured for the packets (240). For example, a measurement class can be determined for the incoming packet (242). The measurement class can be based on, for example, (i) a tenant identifier or other location information provided in the header field of the incoming packet (244), (ii) a hash class for the incoming packet, determined from the header fields of the incoming packet (246), and/or other information included with the header fields of the incoming packets (248). The traffic information can be used by, for example, a controller to optimize the routing information (260). The routing information can be used to optimally route packets on selected VLANS.

Data Center Network

Figure 3:
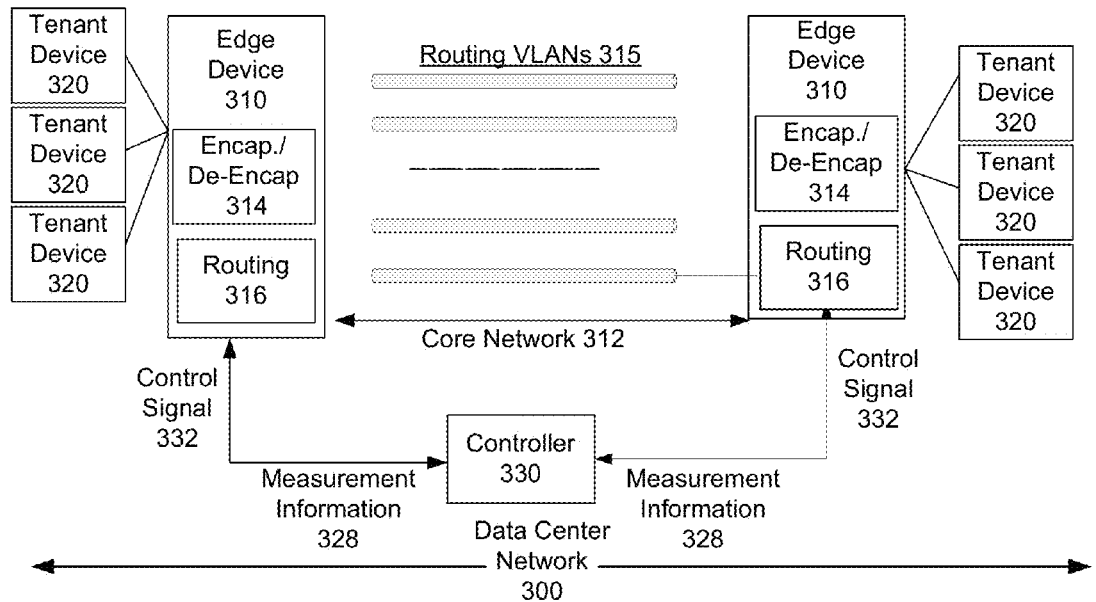
FIG. 3 illustrates an example data center network that incorporates encapsulated ensemble packet routing.

FIG. 3 illustrates an example data center network that incorporates encapsulated ensemble packet routing. A data center network 300 includes edge devices 310 that form an exterior for core network 312. Multiple routing VLANs 315 are defined on the core network 312. The edge devices 310 can include components for encapsulating packets received from tenant devices 320 for transmission across the data center network 300, and for de-encapsulating the encapsulated packets for receipt tenant devices. The encapsulation (and de-encapsulation) can be performed by, for example, an encapsulation module 314. In one implementation, each edge device 310 incorporates an encapsulation module 314 that provides the same encapsulation format or protocol (e.g., PBB). As an addition, the edge device 310 can include an ensemble routing module 316.

In variations, the functionality described with the encapsulation module 314 and the ensemble routing module 316 can be assigned or distributed to multiple devices, or to alternative devices. For example, the encapsulation module 314 and/or the ensemble routing module 316 can be implemented using multiple end devices. As an addition or alternative, some functionality described with the encapsulation module 314 and/or the ensemble routing module 316 can be implemented using different components, such as controller 330.

In an example of FIG. 3, the ensemble routing module 316 can include components for extracting fields from the header of packets encapsulated by the encapsulation module 314. As described with an example of FIG. 1, the ensemble routing module 316 can use the fields from the encapsulated packets to (i) associate the packet with an ensemble of packets, and (ii) select routing VLANs ensembles based on optimization and/or traffic considerations (e.g., load balancing).

The edge device 310 can provide measurement information 328 to the controller 330. For example, the ensemble routing module 316 can communicate measurement information 328 to the controller 330 when packets or ensembles are assigned to routing VLANs 315. The controller 330 can use the measurement information 328 to program (e.g., via control signal 332), for example, one or more TCAM tables that are used by the ensemble routing module 316. For example, the TCAMs can be reprogrammed to reduce traffic on a routing VLAN when the routing VLAN becomes overloaded, resulting in the ensemble routing module 316 assigning an ensemble of packets to a different routing VLAN. In this way, the controller 330 can implement optimization or load-balancing considerations in the manner in which packets or ensembles are distributed on the core network 312.

Edge Device

Figure 4:
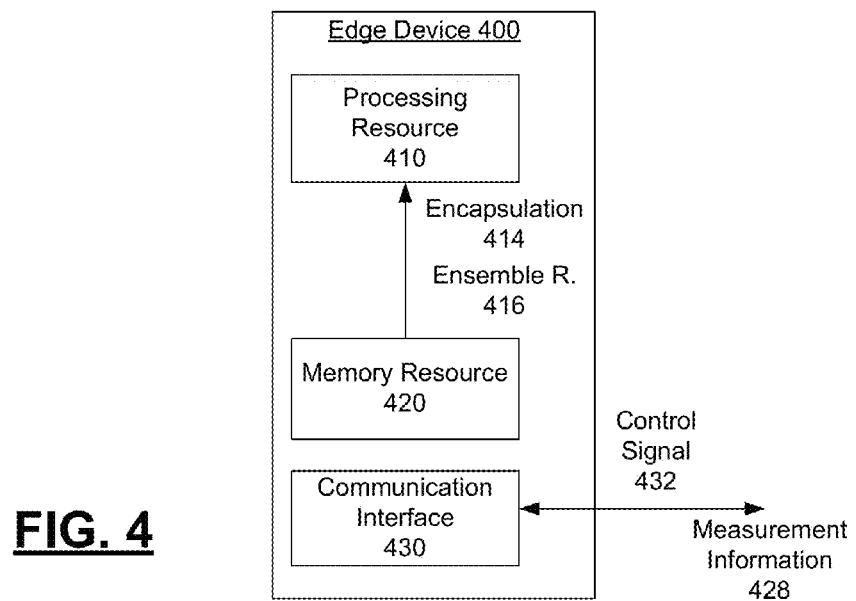
FIG. 4 illustrates an example edge device for implementing ensemble routing of encapsulated packets.

FIG. 4 illustrates an example edge device for implementing ensemble routing of encapsulated packets. In an example of FIG. 4, the edge device 400 includes processing resources 410, memory resources 420, and one or more communication interfaces 430. The edge device 400 may be provided on an edge of a data center network. The memory resources 420 can store instructions and data for implementing encapsulation 414 and ensemble routing 416 on tenant data packets that are received at the edge device 400. The instructions for performing encapsulation 414 can, for example, include implementing an encapsulation module as described with an example of FIG. 1. The instructions for performing ensemble routing can, for example, include instructions for implementing an ensemble routing module as described with an example of FIG. 1.

The communication interfaces 430 can receive the tenant packets. The processing resources 410 can use the encapsulation instructions 414 to encapsulate the incoming tenant packets. The processing resources 410 can also use the ensemble routing instructions 416 to route packets in ensembles onto the data network, using the communication interfaces 430. The communication interfaces 430 can also receive control signals 432, and transmit measurement information 428.

In FIG. 4, the example edge device is illustrative, and variations may exist as to the manner in which ensemble routing of encapsulated packets can be implemented. For example, in variations, some functionality described with, for example, the ensemble routing module 416 can be implemented with a controller or other hardware resource(s).

Although illustrative examples have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an example, can be combined with other individually described features, or parts of other examples. Thus, absence of describing combinations should not preclude the inventor(s) from claiming rights to such combinations.

What is claimed is:

1. A method for routing packets in a data center network, the method being implemented by one or more network devices of the data center network and comprising:
    receiving individual packets at an entry location of the data center network, each of the individual packets including initial header fields corresponding to at least a tenant destination address (TDA) and a tenant source address (TSA);
    encapsulating each of the individual packets to include additional header fields, the additional header fields corresponding to a tenant identifier, the entry location, an exit location of the data center network, and a virtual local area network (VLAN) of the entry location;
    for each encapsulated packet, hashing the additional header fields to determine a hash class for the encapsulated packet;
    selecting a routing VLAN for the encapsulated packet based on at least the tenant identifier and the hash class; and
    overwriting the additional header field corresponding to the VLAN of the entry location with the selected routing VLAN.

2. The method of claim 1, wherein selecting the routing VLAN includes routing the encapsulated packet on the selected routing VLAN as part of an ensemble.

3. The method of claim 2, further comprising:
    determining a routing class for each encapsulated packet based on the hash class, wherein selecting the routing VLAN is further based on the routing class.

4. The method of claim 3, further comprising:
    determining, from the additional header fields, a traffic class for the encapsulated packet, wherein determining the routing class is further based on the traffic class.

5. The method of claim 4, further comprising:
    determining, from the additional header fields, a quality of service (QoS) designation for the encapsulated packet, wherein determining the traffic class is based on the QoS designation.

6. The method of claim 4, wherein determining the traffic class is further based on the entry location and the exit location for the encapsulated packet.

7. The method of claim 1, wherein selecting the routing VLAN is performed using a routing lookup table, the routing lookup table maintaining routing information for routing data packets on the data center network, the routing information being optimized in part using location information for tenants of the data center network.

8. The method of claim 7, further comprising:
    performing a measurement action on at least some of the individual encapsulated packets in order to determine traffic measurements for the data center network, wherein selecting the routing VLAN for the encapsulated packet is further based on traffic measurements provided from performing the measurement action on a collection of previously encapsulated packets.

9. The method of claim 1, wherein encapsulating the individual packets is performed using a Provider Backbone Bridge protocol.

10. A system for routing packets on a data center network, the system comprising:
    a network device to:
        receive individual packets at an entry location of the data center network, each of the individual packets including initial header fields corresponding to at least a tenant destination address (TDA) and a tenant source address (TSA);
        encapsulate each of the individual packets to include additional header fields, the additional header fields corresponding to a tenant identifier, the entry location, an exit location of the data center network, and a virtual local area network (VLAN) of the entry location;
        for each encapsulated packet, hashing the additional header fields to determine a hash class for the encapsulated packet;
        select a routing VLAN for the encapsulated packet based on at least the tenant identifier and the hash class; and
        overwrite the additional header field corresponding to the VLAN of the entry location with the selected routing VLAN; and
    a controller to optimize routing information for use by the network device based on measured traffic information on the data center network.

11. The system of claim 10, wherein the network device further routes the encapsulated packet on the selected routing VLAN as part of an ensemble.

12. The system of claim 10, wherein the network device selects the routing VLAN using the tenant identifier, the hash class, and the routing information provided from the controller.

13. The system of claim 11, wherein the network device selects the routing VLAN using the additional header fields.

14. A system for routing packets in a data center network, the system comprising:
    one or more edge devices for the data center network;
    one or more controllers that communicate information to the one or more edge devices, the information including topology information for the data center network;
    wherein the one or more edge devices:
        receive individual packets each including initial header fields corresponding to at least a tenant destination address (TDA) and a tenant source address (TSA);
        encapsulate each of the individual packets to include additional header fields, the additional header fields corresponding to a tenant identifier, an entry location for the individual packet, and exit location for the encapsulated packet from the data center network, and a virtual local area network (VLAN) of the entry location;
        for each encapsulated packet, hash the additional header fields to determine a hash class for the encapsulated packet;
        select a routing VLAN for the encapsulated packet based on at least the tenant identifier and the hash class; and
        overwrite the additional header field corresponding to the VLAN identifier of the entry location with the selected routing VLAN.

15. The system of claim 14, wherein the entry location and the exit location correspond to a backbone source address and a backbone destination address.

* * * * *